United States Patent Office 3,342,594
Patented Sept. 19, 1967

3,342,594
METHOD FOR MAKING COLOR
PHOSPHOR SCREENS
Sam H. Kaplan, Chicago, Ill., assignor to The Rauland Corporation, Chicago, Ill., a corporation of Illinois
No Drawing. Filed Mar. 31, 1965, Ser. No. 444,400
8 Claims. (Cl. 96—36.1)

This invention relates generally to methods of making mosaic color-phosphor screens, and more particularly to an improved method for forming such screens which reduces color-contamination.

A well-known and presently widely used method of preparing color phosphor screens of various dot-like and line-like mosaic varieties utilizes a process analogous to common photographic techniques. In this process, a slurry comprising phosphor particles suspended in a photosensitive organic gel is applied to a substrate, as the inner glass faceplate of a television picture tube. Selected areas of the applied coating are exposed to actinic rays through apertures in a suitable optical stencil or mask to provide a latent photographic image of the desired dot or line pattern on the substrate. The glass substrate is then washed or developed to remove the unexposed portion of the coating in the case of positive developing resists or the exposed portion in the case of negative resists as is known to the art. These steps are then repeated for each of the other color phosphors with a source of actinic rays disposed at appropriately different positions with respect to the stencil. Alternatively, the screen may be prepared by a hybrid process, laying down one or more of the phosphors by the photographic technique described and the remaining phosphors by other methods, as electrophotography. Finally, the completed screen is baked to volatilize and remove the light-hardened organic gel, leaving only a regular or repetitive pattern of the several phosphors permanently affixed to the substrate.

Color-phosphor screens constructed in accordance with the above described process often exhibit a substantial and undesirable degree of color cross-contamination, that is, an intermingling of the different phosphors. This results from adherence of some of the phosphor particles in a later applied slurry coating to previously applied, photographically developed phosphor areas. This problem is of long standing and numerous approaches have been attempted to alleviate the condition. For example, it has previously been proposed to make the different color phosphors of different average particle size and to deposit these phosphors in the rising order of their particle size so that the later applied larger particles cannot become wedged between the earlier applied smaller particles. It has also been suggested to add certain humectants to the phosphor slurry prior to its deposition. According to one theory, this wets and swells the organic gel holding the previously developed phosphors thereby preventing the newly applied particles from becoming wedged in the interstices of these earlier deposits. However, it has been observed that use of these humectants in any but the last applied phosphor slurry results in an increase, rather than a decrease, in cross-contamination. Also an undesirably large quantity of the humectant is required in the slurry.

It is, therefore, an object of the present invention to provide a new and improved method of making a color-phosphor screen.

It is another object of the invention to provide an improved photographic method of producing color phosphor mosaic screens which substantially reduces intermingling of the successively applied phosphors.

A further object of the present invention is to provide an additive useful in any or all of the color phosphor slurries which substantially reduces cross-contamination between the several phosphors.

Accordingly, the invention is directed to a method of producing on a substrate a mosaic-type color-phosphor screen having a plurality of interspersed elemental areas of different phosphor materials, each exhibiting a unique color response characteristic, while preventing substantial cross-contamination between these phosphor materials. The steps of this method comprise applying to the substrate a slurry coating including phosphor particles of a predetermined type contained in a photosensitive organic gel, exposing selected areas of the coating to actinic rays in a predetermined pattern to establish a latent design image in the coating, and then developing the partially exposed coating to remove certain portions thereof as determined by the latent image. Undesirable intermingling of the separately applied phosphors, as normally encountered in this method, is substantially reduced by including an organic amine, such as ethanol amine, in the next slurry coating applied to the substrate. Where any further remaining phosphors are deposited on the substrate by means of the photographic slurry process, the organic amine is useful in each of the photosensitive solutions to reduce contamination of previously applied and developed phosphors with those of later applied coatings.

In accordance with the invention, color-phosphor mosaic screens are prepared, at least partially, by use of the well-known photo-resist method outlined above. More specifically, a photosensitive slurry containing appropriate color producing phosphor particles is applied to the inner faceplate of a picture tube, dried and exposed to actinic light from a point source disposed opposite a suitable optical mask, such as the multiple apertured mask employed in the completed tube of the shadow mask type. The series of spaced latent designs, in this case circular dots, are then developed, as by washing with the proper solvent. These steps may be repeated with the remaining phosphors, preferably using the organic amine agent in each of the following slurries for best results.

Of course, an essential pre-requisite to use of any additional agent in photosensitive slurries such as those discussed, is compatibility with the selected photosensitive resist; for example, the additive must not precipitate the resist from its solution, and further along these lines, the agent must itself be water soluble so as to assure uniform dispersal through the slurry solution. It has also been found that the vapor pressure or boiling point of the employed additive should lie between 80° and 300° C., and preferably should approximate that of water, i.e., 100° C. Excessive volatility is to be avoided as the agent would otherwise vaporize during drying of the screen, yet the material should dissolve out during development or be driven off at the tube bake-out temperature, usually about 440° C.

The factor, however, that appears most influential in providing the desirable results obtained has been observed to be the alkaline character of the substance. Hence, it has been found that the agent should be chosen from that class of compounds known generally as organic amines. These compounds have an organic or carbon framework and are derivatives of ammonia. More specifically, many aliphatic amines or alkylolamines exhibit the desired characteristics. For example, diethanol amine, diisopropanol amine, monoisopropanol amine, triethanolamine and morpholine are satisfactory for such use. One alkylolamine that has proved notably successful in practice is 2-amino ethanol ($NH_2CH_2CH_2OH$), known also as ethanol amine.

In conventional practice, the slurry is usually slightly acidic, typically about pH 5, and it has been observed that optimum results obtain when the quantity of the organic amine in the phosphor slurry is less than one percent by weight of the water content of the prepared slurry and preferably approximately .2 of one percent by weight, but sufficient to alter the pH or base-acid measure of the slurry solution to the extent that the resulting solution has a pH lying between approximately pH 6 and pH 8.5.

With these considerations in mind for choosing a proper agent, it may also prove helpful to examine an illustrative process and ingredients therefor which has provided particularly satisfactory results in practice. Those skilled in the art will recognize that the relative amount of the photosensitive gel, the particular composition of the phosphor particles, and whether or not the photosensitive gel is of the positive type, i.e., becomes insoluble upon exposure to light, or of the negative type, i.e., becomes soluble upon exposure to light, are factors independent of the present invention. Specifically, a typical formula for the slurry and the preferred method of its application to a substrate upon which the green phosphor has already been placed by a conventional photographic process is as follows:

(1) Mix the following ingredients:
 (a) 208 grams blue phosphor, silver activated zinc sulfide (ZnS),
 (b) 167 grams aqueous solution of polyvinyl alcohol (PVA)—10% concentration by weight,
 (c) 184 cc. $H_2O$.
(2) Ball mill the above mixture for two hours.
(3) Add the following ingredients to complete the slurry:
 (a) 331 cc. $H_2O$,
 (b) 63 cc. aqueous solution of ammonium dichromate—10% concentration by weight,
 (c) 206 grams aqueous solution of PVA—10% concentration by weight,
 (d) 1.5 cc. 2-amino ethanol.

The above slurry had a measured viscosity of 23.5 centipoises at a temperature of 77° C., and the pH of the slurry solution experienced an increase from pH 5+ to pH 6+ upon addition of the 1.5 cc. of 2-amino ethanol. The concentration of 2-amino ethanol to water content of this slurry is approximately .174 of one percent. The slurry being photosensitive should be kept under subdued light until used.

(4) Spray or otherwise apply the milled slurry to the entire phosphor screen and allow to dry at moderate or room temperatures.

(5) Expose the newly applied photosensitive resist with actinic light from a source, such as a mercury vapor lamp, through an optical stencil, such as the shadow mask used in conventional dot screen tubes. The exposure, as will be understood, depends upon such factors as light intensity, proximity of the lamp to the screen, etc. and is usually about 8 minutes. The exposure preferably occurs at room temperature.

(6) Wash the screen with pure water to remove the unexposed slurry.

(7) Repeat each step of the preceding process substituting 300 grams of a red phosphor, silver activated zinc cadmium sulfide (ZnCdS).

(8) Complete assembly of color tube, evacuate, and bake tube at 440° C. for one hour, as in conventional color tube manufacturing processes. Under the influence of this thermal energy the residual organic support materials for the phophor are volatilized, or other additive employed in accordance with the present invention.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. The method of producing on a substrate a mosaic type color phosphor screen having a plurality of interspersed elemental areas of different phosphor materials each exhibiting a unique color response characteristic, while preventing substantial cross-contamination between said phosphor materials, which method comprises:
 depositing phosphor particles of a first predetermined type on preselected areas of said substrate;
 applying to said substrate a slurry coating including phosphor particles of a second predetermined type contained in a photosensitive organic gel;
 exposing selected areas of said coating to actinic rays in a predetermined pattern to establish a latent design image in said coating;
 developing the partially exposed coating to remove certain portions thereof as determined by said latent image;
 and including an organic amine in said slurry coating as applied to said substrate.

2. The invention as set forth in claim 1 and wherein said organic amine is an aliphatic amine.

3. The invention as set forth in claim 1 and wherein said organic amine is an alkylolamine.

4. The invention as set forth in claim 1 and wherein said organic gel is polyvinyl alcohol and said organic amine is 2-amino ethanol.

5. The invention as set forth in claim 1 and wherein said organic gel is polyvinyl alcohol, said slurry further includes water and said organic amine is 2-amino ethanol and said 2-amino ethanol is present in said slurry in an amount not exceeding one percent by weight of the water content of said slurry, but in an amount sufficient to render the acid-base measure of said slurry between pH 6 and pH 8.5.

6. The method of producing on a substrate a mosaic type color phosphor screen having a plurality of interspersed elemental dots of different phosphor materials each exhibiting a unique color response characteristic, while preventing substantial cross-combination between said phosphor materials, which method comprises:
 depositing phosphor particles of a first predetermined type on preselected areas of said substrate;
 applying to said substrate a slurry coating including phosphor particles of a second different predetermined type contained in a solution of water and a photosensitive organic gel, said slurry further containing an organic amine in a quantity not exceeding one percent by weight of the water content of said slurry but sufficient to render the acid-base measure of said slurry approximately between pH 6 and pH 8.5;
 exposing selected areas of said coating to actinic rays through a multiple apertured shadow mask to establish a latent design image in said coating;
 developing the partially exposed coating to remove certain portions thereof as determined by said latent image;
 applying to said substrate a slurry coating including phosphor particles of a third different predetermined type contained in a solution of water and a photosensitive organic gel, said slurry further containing an aliphatic amine in a quantity not exceeding one percent by weight of the water content of said slurry but sufficient to render the acid-base measure of said slurry approximately between pH 6 and pH 8.5;
 exposing different selected areas of said coating to actinic rays through said multiple aperture shadow mask to establish a latent design image in said coating;
 and developing the partially exposed coating to remove certain portions thereof as determined by said latent image.

7. The method of producing on a substrate a mosaic type color phosphor screen having a pulrality of interspersed elemental dots of different phosphor materials each exhibiting a unique color response characteristic, while preventing substantial cross-contamination between said phosphor materials, which method comprises:

applying to said substrate a slurry coating including phosphor particles of a predetermined type contained in a photosensitive organic gel;

exposing selected areas of said coating to actinic rays through a multiple apertured shadow mask to establish a latent design image in said coating;

developing the partially exposed coating to remove certain portions thereof as determined by said latent image;

repeating the preceding steps for each of the remaining phosphors to be deposited on said screen;

and including an organic amine in at least one of said slurry coatings as applied to said substrate in an amount sufficient to render the acid-base measure of said slurry coating approximately between pH 6 and pH 8.5.

8. The method of producing on a substrate a mosaic type color phosphor screen having a plurality of interspersed elemental dots of different phosphor materials each exhibiting a unique color response characteristic, while preventing substantial cross-contamination between said phosphor materials, which method comprises:

applying to said screen a slurry coating including phosphor particles of a predetermined type contained in a solution of water and polyvinyl alcohol;

drying said coating;

exposing selected areas of said coating to actinic rays through a multiple apertured shadow mask;

washing the partially exposed coating with water to remove the unexposed portions thereof;

repeating the preceding steps for each of the remaining phosphors to be deposited on said screen;

and including in at least one of said slurry coatings, as applied to said substrate, ethanolamine in an amount not exceeding one percent by weight of said water content of said slurry, but in an amount sufficient to provide an acid-base measure between pH 6 and pH 8.5 for the slurry including ethanolamine.

References Cited
UNITED STATES PATENTS

| | | | |
|---|---|---|---|
| 2,376,437 | 5/1945 | Leverenz. | |
| 2,873,205 | 2/1959 | Dijkstra et al. | 117—33.5 |
| 2,996,380 | 8/1961 | Evans | 96—36.1 |
| 3,017,288 | 1/1962 | Windsor | 117—33.5 |
| 3,054,672 | 9/1962 | Angelucci | 96—36.1 |
| 3,140,176 | 7/1964 | Hoffman | 96—36.1 |

OTHER REFERENCES

Sadowski et al., "Photodeposition of Luminescent Screen," Journal of Electrochemical Society, February 1958, pp. 105–107.

NORMAN G. TORCHIN, *Primary Examiner.*

C. L. BOWERS, *Assistant Examiner.*